(12) United States Patent
Lane

(10) Patent No.: US 7,720,999 B2
(45) Date of Patent: May 18, 2010

(54) SYSTEM AND METHOD FOR OPTIMIZING MULTIMEDIA COMPRESSION USING PLURAL ENCODERS

(75) Inventor: Richard D. Lane, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 116 days.

(21) Appl. No.: 10/305,581

(22) Filed: Nov. 26, 2002

(65) Prior Publication Data

US 2004/0103216 A1  May 27, 2004

(51) Int. Cl.
*G06F 15/16* (2006.01)
(52) U.S. Cl. ............... 709/247; 709/202; 709/231; 709/246; 370/230; 370/328
(58) Field of Classification Search ......... 709/231–234, 709/202–203, 217–219, 246–247; 370/464–465, 370/328–330, 229–235
See application file for complete search history.

(56) References Cited

U.S. PATENT DOCUMENTS

| | | | |
|---|---|---|---|
| 5,953,460 A | 9/1999 | Wu | |
| 5,983,005 A * | 11/1999 | Monteiro et al. | 709/231 |
| 5,991,302 A | 11/1999 | Berl et al. | 370/400 |
| 5,999,985 A * | 12/1999 | Sebestyen | 709/247 |
| 6,065,050 A * | 5/2000 | DeMoney | 709/219 |
| 6,195,680 B1 * | 2/2001 | Goldszmidt et al. | 709/203 |
| 6,366,959 B1 * | 4/2002 | Sidhu et al. | 709/231 |
| 6,377,562 B1 * | 4/2002 | Schneider | 370/330 |
| 6,415,326 B1 * | 7/2002 | Gupta et al. | 709/231 |
| 6,490,250 B1 * | 12/2002 | Hinchley et al. | 370/232 |
| 6,496,980 B1 * | 12/2002 | Tillman et al. | 725/90 |
| 6,499,060 B1 * | 12/2002 | Wang et al. | 709/231 |
| 6,501,797 B1 * | 12/2002 | van der Schaar et al. | 375/240.12 |
| 6,510,553 B1 * | 1/2003 | Hazra | 725/87 |
| 6,594,773 B1 * | 7/2003 | Lisitsa et al. | 713/600 |
| 6,676,521 B1 | 1/2004 | La Mura et al. | 463/42 |
| 6,810,409 B1 * | 10/2004 | Fry et al. | 709/202 |
| 6,885,319 B2 * | 4/2005 | Geiger et al. | 341/51 |
| 6,957,350 B1 * | 10/2005 | Demos | 380/203 |
| 7,072,366 B2 * | 7/2006 | Parkkinen et al. | 370/538 |

(Continued)

FOREIGN PATENT DOCUMENTS

EP  0782341  7/1997

(Continued)

OTHER PUBLICATIONS

International Search Report - PCT/US03/038159, International Searching Authority - US, Alexandria, VA Sep. 9, 2004.

(Continued)

*Primary Examiner*—Bharat N Barot
(74) *Attorney, Agent, or Firm*—Sandip S. Minhas; John Rickenbrode

(57) ABSTRACT

A multimedia stream is compressed in parallel by plural encoders, the compressed stream outputs of which are dynamically evaluated for merit. A best one of the compressed streams is transmitted, along with information regarding the particular compression algorithm that was used, so that the receiver's decoder can decompress the stream for presentation.

36 Claims, 2 Drawing Sheets

*LOGIC*

U.S. PATENT DOCUMENTS

| | | | |
|---|---|---|---|
| 7,082,164 B2 * | 7/2006 | Chaddha | 375/240.12 |
| 7,289,675 B2 * | 10/2007 | Rose | 382/238 |
| 2002/0038374 A1 * | 3/2002 | Gupta et al. | 709/231 |
| 2002/0150047 A1 * | 10/2002 | Knight et al. | 370/230.1 |
| 2004/0039837 A1 * | 2/2004 | Gupta et al. | 709/231 |
| 2004/0081198 A1 | 4/2004 | Gardner et al. | |

FOREIGN PATENT DOCUMENTS

| | | |
|---|---|---|
| JP | 03-220920 | 9/1991 |
| JP | 05-158495 | 6/1993 |
| JP | 08-046911 | 2/1996 |
| JP | 2000-023154 | 1/2000 |
| WO | 0045516 | 8/2000 |

OTHER PUBLICATIONS

International Preliminary Examination Report - PCT/US03/038159, IPEA/US, Alexandria, VA Nov. 8, 2004.

Supplementary European Search Report - EP03796536, Search Authority - Berlin Patent Office, Dec. 11, 2009.

* cited by examiner

LOGIC**

SYSTEM AND METHOD FOR OPTIMIZING MULTIMEDIA COMPRESSION USING PLURAL ENCODERS

FIELD OF THE INVENTION

The present invention relates generally to multimedia transmission.

BACKGROUND

Multimedia streams, which typically include video frames, are compressed prior to transmission or storage, to conserve bandwidth. Compressing video generally means representing a relatively larger group of bits with a relatively smaller group of bits. Received compressed multimedia streams are decompressed back to their (approximate) original format for display.

It will readily be appreciated that many compression schemes are possible. More specifically, many different compression schemes, which use algorithms and/or basis functions (collectively herein, "compression algorithms"), are possible. Ordinarily two goals exist for compression. One, of course, is to compress the multimedia stream as much as possible. Competing with the first goal is the desire not to lose excessive information during the compression and expansion process. A high quality encoder, which is the name of the device typically used for compression, is configured with fixed compression algorithms that seek to optimize these two competing goals.

The present invention recognizes that depending on the nature of the particular multimedia streams to be compressed, a first compression scheme might be optimal for a first stream while a second compression scheme might be optimal for a second stream. Indeed, the compression of different parts of the same stream might be best optimized using more than a single compression scheme.

One way to handle this would be to provide an encoder that could dynamically change its compression algorithms to suit the multimedia stream currently being compressed. As understood by the present invention, however, this could require changing the compression algorithm, measuring the quality of the resulting compression, changing the algorithm again, and so on, with the candidate algorithms being tested in series. As further understood herein, while this might be acceptable for storing compressed streams, it is problematic in the context of transmission of compressed multimedia, during which sufficient time might not exist to test candidate compression algorithms in series. Having made these critical observations, the invention disclosed below has been provided.

SUMMARY OF THE INVENTION

A method for processing a multimedia stream includes rendering, from the multimedia stream, a first compressed stream using a first compression algorithm. The method further includes, in parallel with the first rendering, rendering at least a second compressed stream using a second compression algorithm, and then evaluating the first and second compressed streams. Based on the evaluating act, a best one of the compressed streams is transmitted.

In a preferred embodiment, the first compressed stream is rendered using a first encoder that executes the first compression algorithm. The second compressed stream, on the other hand, is rendered using a second encoder executing the second compression algorithm. More than two encoders can be used and evaluated.

To aid in decompressing the compressed stream after transmission and receipt, information that represents the compression algorithm of the best compressed stream is transmitted along with the stream. The evaluation can be based on compression effectiveness and/or stream quality and/or requirements of aggregated transmission channels and/or capabilities of transmission channels.

In another aspect, a system for encoding an original multimedia stream for transmission includes a first encoder encoding the original stream using at least a first encoding algorithm to render a first encoded stream, and a second encoder encoding the original stream using at least a second encoding algorithm to render a second encoded stream. A processor selects one of the first and second encoded streams to render a selected stream representative of the original stream.

In still another aspect, a product for selecting a compressed stream for transmission includes means for deriving a first compressed stream from a multimedia stream. The product also includes means for deriving a second compressed stream from the multimedia stream in parallel with the first compressed stream. Means are provided for dynamically selecting a best one of the compressed streams for transmission.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
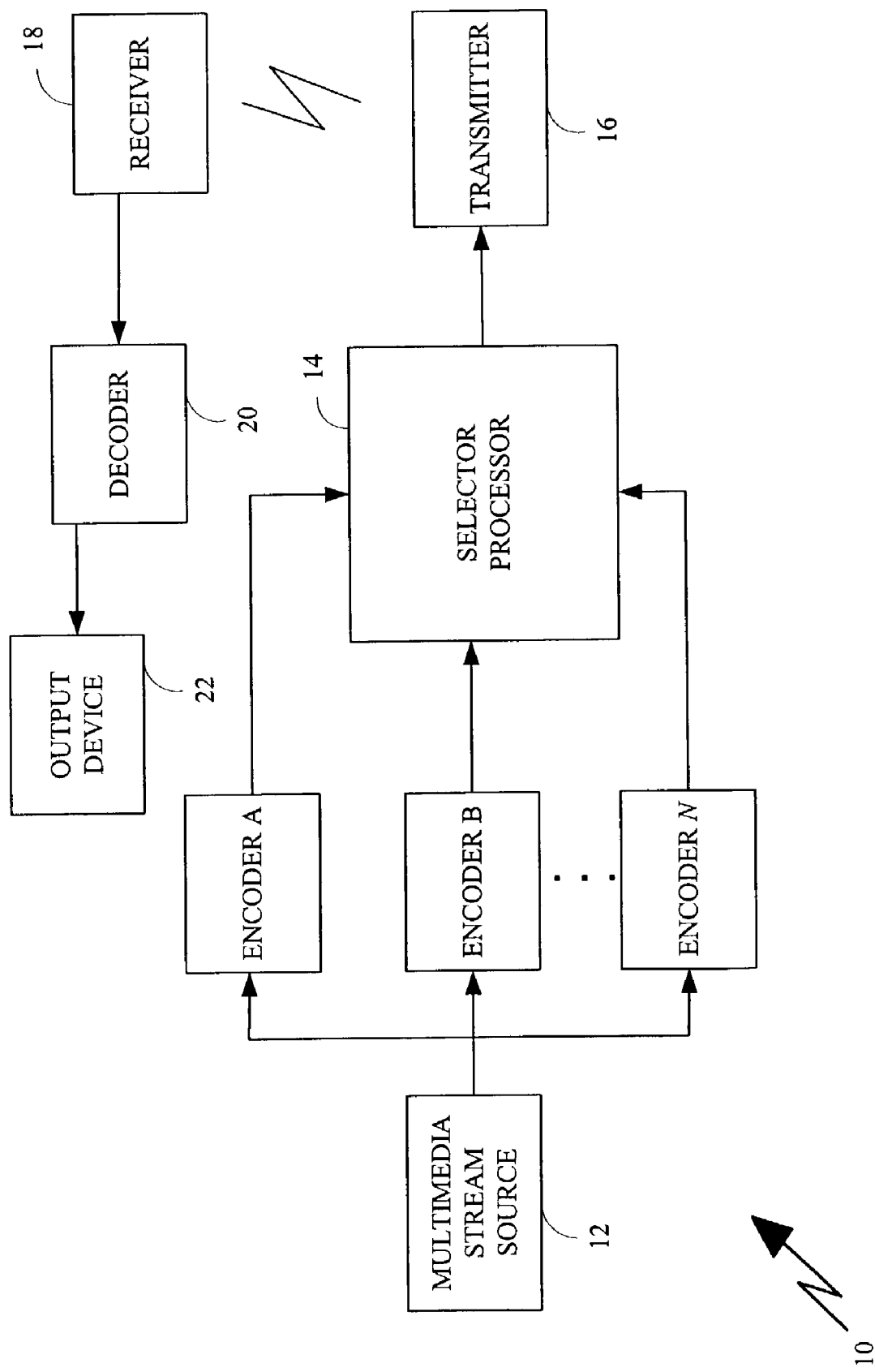
FIG. 1 is a simplified functional block diagram of the present system.

Referring initially to FIG. 1, a system is shown, generally designated 10, for compressing and transmitting multimedia including video streams, from a source 12 of multimedia. The source 12 may be a content provider, or a local data storage device or receiver that provides multimedia streams. The particular character of the source 12 is not germane to the present invention. The multimedia streams herein are assumed to be digitalized.

As shown, the system 10 includes plural compression encoders A through N that receive a stream to be compressed in parallel and that use respective compression schemes to compress the stream in parallel with each other. The outputs of the encoders A through N are received by a selection processor 14, which evaluates the outputs for merit as further discussed below and then sends the selected stream or streams to a transmitter 16 for transmission thereof. As discussed further below, the selection decision can take into account such parameters as signal to noise ratios, available communication layers, transmission channel characteristics, consumer preferences, program stream importance, available bandwidth, and others. A receiver 18 receives the stream and sends it to a decoder 20, which decompresses the stream for presentation on a display device 22, such as a video monitor, printer, speaker, etc.

The non-limiting preferred embodiment shown in FIG. 1 shows a multimedia transmitter 16 that uses wireless means, and more particularly that uses code division multiple access (CDMA) principles. The streams can be broadcast to plural receivers if desired, or transmitted using point-to-point wireless transmission principles. Multicast transmission principles can also be used. It is to be understood that the present principles apply to other forms of wireless communication such as GSM, TDMA, wideband CDMA, OFDM, etc. as well as transmission of multimedia over cable systems, the Internet, etc.

Figure 2:
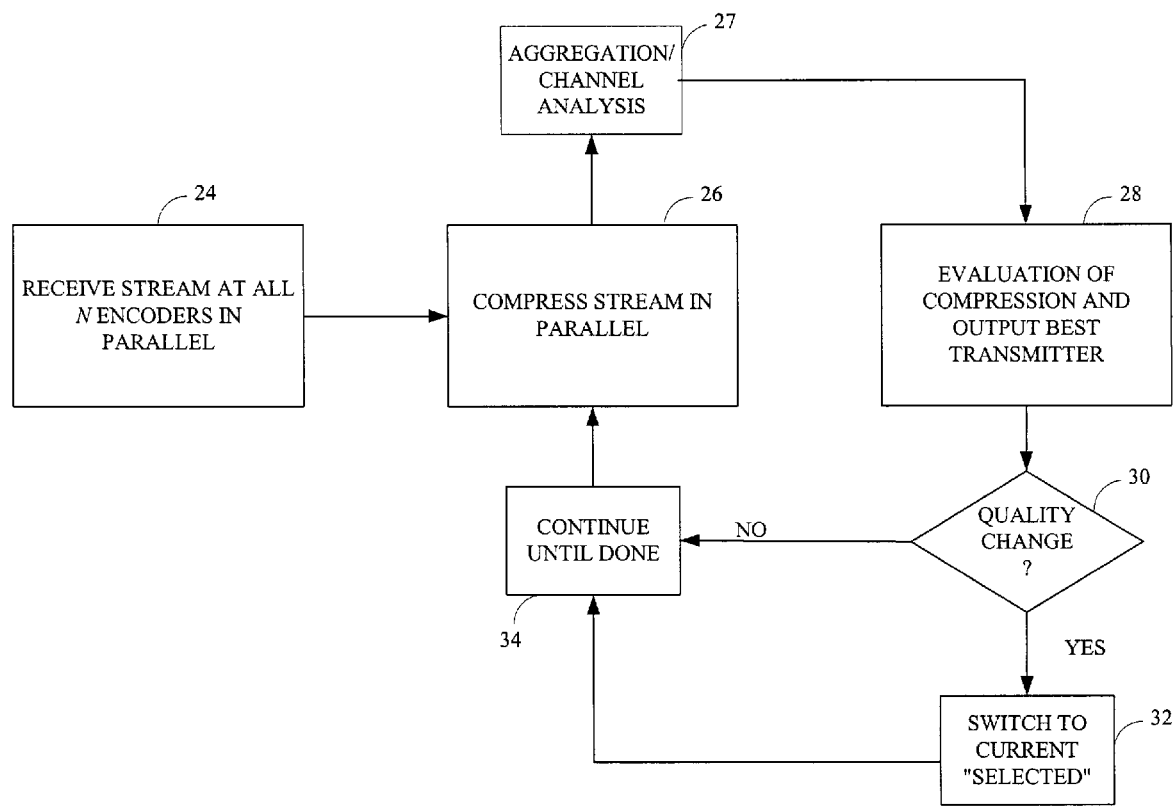
FIG. 2 is a flow chart of the logic executed by the selection processor.

Now referring to FIG. 2, the compression scheme selection logic can be seen. Commencing at block 24, a multimedia stream from the source 12 is received in parallel by all encoders A, B, . . . , N. At block 26, the encoders compress the same stream in parallel with each other, using respective compression algorithms. Non-limiting examples of ways to diversify the encoders and/or encoder outputs include using, among the encoders, different numbers and types of layers, different data amounts per second that are assigned to each layer, different signal to noise ratios, different compression techniques, different total bandwidths, etc. It is noted that current internet multimedia streaming applications provide a user with multiple fixed encoding choices, including the required bandwidth (e.g., 56 Kbps, 100 Kbps, 300 Kbps) and size (e.g., video QCIF, CIF, audio mono, stereo, 5.1, etc.)

The compressed streams output by the encoders are sent to the selection processor 14 for evaluation at block 28. If desired, in one non-limiting exemplary embodiment the streams can be first sent to block 27, wherein information is determined regarding the aggregated streams and available transmission channels, e.g., aggregated channel requirements, current channel status, and current transmission channel capabilities, alone or in light of stream characteristics. At block 28, the processor 14 evaluates the merits of the streams including, if desired, taking into account the requirements of the aggregated channels and the current status and capabilities of the transmission channels. It will be appreciated that the streams are evaluated as nearly concurrently as possible. The evaluation itself can be based on the compression effectiveness provided by each encoder, i.e., in a non-limiting example it can be determined which encoder most reduces the size of its compressed stream vis-a-vis the size of the original multimedia stream received from the source 12. Also, the evaluation can be based on the quality of the compressed stream. Any suitable quality metric can be used. In one non-limiting example, portions of each compressed stream can be decompressed and then the decompressed portions compared against the corresponding portion of the original stream, with the encoder providing the closest match being designated as the "highest quality" encoder. When more than one evaluation criterion is used, e.g., when compression effectiveness, numbers of layers, priority of stream, and stream quality are evaluated, a respective weighted average measure may be generated as an overall indicator of each encoder's efficiency in compressing the particular multimedia stream being processed. In one non-limiting example, compression effectiveness might count for 80% of the total score and stream quality might count for 20%. In another non-limiting example, the ability to compress a base layer of a stream to, e.g., 32 Kbps and to compress a second (enhancement) layer of the stream to less than 24 Kbps might count for 50% of the total score and stream quality might count for 50%, but not being able to compress a base layer to less than 48 Kbps may eliminate an encoding choice entirely. Other heuristics can be used including those tailored to the capabilities of the receiving devices.

As indicated at block 28, the "best" one of the compressed streams as indicated by its merit is output for transmission. Decision diamond 30 indicates that the process above can be executed in a continuous loop if desired. Specifically, if a change in which one of the compressed streams is the "best" compressed stream is indicated, the logic can flow to block 32 to output the new "best" compressed stream, and then proceed to block 34 to continue the process by looping back to block 26 until the entire multimedia stream has been compressed, evaluated, and transmitted. If the test at decision diamond 30 is negative, the logic loops back to block 26 through block 34 as described. Thus, the original multimedia stream can, if desired, undergo constant parallel compression, and the selection of the "best" one of the compressed streams can be continuous if desired and dynamic, with potentially plural compression schemes being used for respective parts of the original stream based on the merit of each scheme with respect to each part.

As part of the "best" compressed stream output, an indication of the particular compression scheme that was used to generate the "best" output is transmitted along with the stream, e.g., in a header of video frames of the stream or on a separate channel therefrom. Using this indication, the decoder 20 can be appropriately configured to decompress the stream.

While the particular SYSTEM AND METHOD FOR OPTIMIZING MULTIMEDIA COMPRESSION USING PLURAL ENCODERS as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. '112, sixth paragraph, unless the element is expressly recited using the phrase "means for" or, in the case of a method claim, the element is recited as a "step" instead of an "act".

What is claimed is:

1. A method for processing a multimedia stream, comprising:
   rendering, from the multimedia stream, a first compressed stream comprising a first base layer and a first enhancement layer using a first compression algorithm;
   in parallel therewith, rendering, from the multimedia stream, at least a second compressed stream comprising a second base layer and a second enhancement layer using a second compression algorithm;
   evaluating at least the first and second compressed streams;
   via a selection processor, selecting, based on the evaluating act, one of the compressed streams as a best stream, wherein the best stream selection is based on numbers of bits per second of the first and second base layers relative to a base layer compression threshold and numbers of bits per second of the first and second enhancement layers relative to an enhancement layer compression threshold; and
transmitting the selected best stream.

2. The method of claim 1, wherein the first compressed stream is rendered using a first encoder executing the first compression algorithm and the second compressed stream is rendered using a second encoder executing the second compression algorithm.

3. The method of claim 1, further comprising rendering at least a third compressed stream from the multimedia stream using a third compression algorithm in parallel with rendering the first and second compressed streams.

4. The method of claim 1, further comprising transmitting information representative of the compression algorithm of the selected compressed stream.

5. The method of claim 4, further comprising using the information representative of the compression algorithm of the selected compressed stream to configure a decoder for facilitating decompressing the selected compressed scheme.

6. The method of claim 1, wherein the evaluating act is undertaken at least in part by evaluating a compression quality.

7. The method of claim 1, wherein the evaluating act is based at least in part on compression effectiveness.

8. The method of claim 1, wherein the evaluating act is based at least in part on requirements of aggregated transmission channels.

9. The method of claim 1, wherein the evaluating act is based at least in part on capabilities of transmission channels.

10. The method of claim 1, wherein the transmitting act is undertaken wirelessly.

11. The method of claim 10, wherein the transmitting act is undertaken using code division multiple access (CDMA) principles.

12. The method of claim 10, wherein the transmitting act is undertaken using orthogonal frequency-division multiplexing (OFDM) principles.

13. The method of claim 10, wherein the transmitting act is undertaken using digital broadcast principles.

14. A system for encoding an original multimedia stream for transmission, comprising:
a first encoder encoding the original stream using at least a first encoding algorithm to render a first encoded stream comprising a first base layer and a first enhancement layer;
a second encoder encoding the original stream, in parallel with the first encoder encoding the original stream, using at least a second encoding algorithm to render a second encoded stream comprising a second base layer and a second enhancement layer; and
a processor selecting a best stream out of the first and second encoded streams, wherein said best stream selection is based on numbers of bits per second of the first and second base layers relative to a base layer compression threshold and numbers of bits per second of the first and second enhancement layers relative to an enhancement layer compression threshold to render a selected stream representative of the original stream.

15. The system of claim 14, wherein the processor executes the selecting act at least in part based on qualities of each encoded stream.

16. The system of claim 14, wherein the processor executes the selecting act at least in part based on compression effectiveness.

17. The system of claim 14, further comprising a wireless transmitter for transmitting an encoded stream.

18. The system of claim 14, wherein the processor executes the selecting act plural times for the original stream.

19. The system of claim 14, further comprising a least a third encoder.

20. The system of claim 14, wherein the processor sends, along with the selected stream, information pertaining to the respective algorithm of the respective encoder from which the selected stream was generated.

21. The system of claim 14, further comprising a decoder selecting a decoding algorithm using the information.

22. The system of claim 14, wherein the processor executes the selecting act at least in part based on requirements of aggregated channels.

23. The system of claim 14, wherein the processor executes the selecting act at least in part based on capabilities of transmission channels.

24. The system of claim 14, wherein the processor sends, on a separate channel from the selected stream, information pertaining to the encoder generating the selected stream.

25. The system of claim 17, wherein the wireless transmitter is a code division multiple access (CDMA) transmitter.

26. The system of claim 17, wherein the wireless transmitter is an orthogonal frequency division multiplexing (OFDM) transmitter.

27. The system of claim 17, wherein the wireless transmitter is a digital broadcast transmitter.

28. A product for selecting a compressed stream for transmission, comprising:
means for deriving a first compressed stream comprising a first base layer and a first enhancement layer from a multimedia stream using a first compression algorithm;
means for deriving a second compressed stream comprising a second base layer and a second enhancement layer from the multimedia stream using a second compression algorithm, wherein the first compressed stream is derived in parallel with the second compressed stream; and
means for dynamically selecting a best stream, selected from one of the compressed Streams, wherein the best stream selection is based on numbers of bits per second of the first and second base layers relative to a base layer compression threshold and numbers of bits per second of the first and second enhancement layers relative to an enhancement layer compression threshold for transmission.

29. The product of claim 28, further comprising means for sending, along with the selected one of the compressed streams, an indication of a compression scheme used to generate the selected one of the compressed streams.

30. The product of claim 29, further comprising means for transmitting the selected one of the compressed streams.

31. The product of claim 30, further comprising means for decompressing the selected one of the compressed streams when received, at least in part using the indication of a compression scheme.

32. The product of claim 31, further comprising means for sending, on a separate channel from the selected stream, information pertaining to the means generating the selected stream.

33. The product of claim 32, further comprising wireless transmission means for wirelessly transmitting the selected stream.

34. The product of claim 33, wherein the wireless transmission means is a code division multiple access (CDMA) transmitter.

35. The product of claim 33, wherein the wireless transmission means is an orthogonal frequency division multiplexing (OFDM) transmitter.

36. The product of claim 33, wherein the wireless transmission means is a digital broadcast transmitter.

* * * * *